(12) United States Patent
Emerson

(10) Patent No.: US 8,580,183 B2
(45) Date of Patent: *Nov. 12, 2013

(54) COLLECTION TUBES APPARATUS, SYSTEMS, AND METHODS

(71) Applicant: The Regents of the University of California, Oakland, CA (US)

(72) Inventor: Jane F. Emerson, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/681,262

(22) Filed: Nov. 19, 2012

(65) Prior Publication Data

US 2013/0143727 A1 Jun. 6, 2013

Related U.S. Application Data

(60) Continuation of application No. 13/482,234, filed on May 29, 2012, now Pat. No. 8,318,077, which is a division of application No. 12/691,569, filed on Jan. 21, 2010, now Pat. No. 8,206,638, which is a division of application No. 11/933,839, filed on Nov. 1, 2007, now Pat. No. 7,673,758, which is a continuation-in-part of application No. 11/499,436, filed on Aug. 4, 2006, now Pat. No. 7,674,388.

(60) Provisional application No. 60/707,299, filed on Aug. 10, 2005.

(51) Int. Cl.
*B29C 35/08* (2006.01)
*B01D 21/26* (2006.01)
*B01D 12/00* (2006.01)

(52) U.S. Cl.
USPC ........ 264/496; 264/494; 210/512.3; 210/511; 210/516; 210/781; 210/782; 210/789; 252/60; 435/2

(58) Field of Classification Search
USPC ............... 264/494, 496; 210/512.3, 511, 516, 210/781, 782, 789; 252/60; 435/2
See application file for complete search history.

(56) References Cited

U.S. PATENT DOCUMENTS 3,647,070 A 3/1972 Adler
3,780,935 A 12/1973 Lukacs et al.
(Continued)

FOREIGN PATENT DOCUMENTS

EP 0375566 12/1989
EP 0520185 5/1992
(Continued)

OTHER PUBLICATIONS

Definition of Solid from Websters' dictionary retrieved from Internet on Jul. 7, 2009 at <http:/lionreference.chadwyck.com/searchFulltext.do?id=33051427&idType=offset&divLevel=2&queryId=../session/1246981509_23137&area=mwd&forward=refshelft&trail=refshelf>.

*Primary Examiner* — Timothy Kennedy
(74) *Attorney, Agent, or Firm* — Fish & Associates, PC

(57) ABSTRACT

Methods of producing collection tubes are presented. The methods include providing a separator substance that can rapidly polymerize in a short time to a desired hardness and disposing the separator substance within the lumen of the tube. The separator substance is formulated to have a density between an average density of a serum fraction of whole blood and a cell-containing fraction of whole blood, and to be flowable with whole blood. Upon centrifugation of a tube having blood, the separator substance forms a barrier between the whole blood fractions. The barrier rapidly hardens forming a solid barrier when triggered by a suitable energy source.

5 Claims, 3 Drawing Sheets

Blood collection tube of Figure 1B after centrifugation.

(56) References Cited

U.S. PATENT DOCUMENTS

| | | |
|---|---|---|
| 3,852,194 A | 12/1974 | Zine, Jr. |
| 3,920,549 A | 11/1975 | Giliello et al. |
| 3,920,557 A | 11/1975 | Ayres |
| 3,976,579 A | 8/1976 | Bennet |
| 4,050,451 A | 9/1977 | Columbus |
| 4,052,320 A | 10/1977 | Jakubowicz |
| 4,101,422 A | 7/1978 | Lamont et al. |
| 4,190,535 A | 2/1980 | Luderer et al. |
| 4,235,725 A | 11/1980 | Semersky |
| 4,295,974 A | 10/1981 | Cornell |
| 4,350,593 A | 9/1982 | Kessler |
| 4,386,003 A | 5/1983 | Fiehler |
| 4,417,981 A | 11/1983 | Nugent |
| 4,457,782 A | 7/1984 | Honda et al. |
| 4,569,764 A | 2/1986 | Satchell |
| 4,751,001 A | 6/1988 | Saunders |
| 4,770,779 A | 9/1988 | Ichikawa et al. |
| 4,816,168 A | 3/1989 | Carrol et al. |
| 4,818,418 A | 4/1989 | Saunders |
| 4,844,818 A | 7/1989 | Smith |
| 4,867,887 A | 9/1989 | Smith |
| 4,946,601 A | 8/1990 | Fiehler |
| 4,994,393 A | 2/1991 | Pradhan et al. |
| 5,124,434 A | 6/1992 | O'Brien |
| 5,266,199 A | 11/1993 | Tsukagoshi et al. |
| 5,269,927 A | 12/1993 | Fiehler |
| 5,304,605 A | 4/1994 | Murakami et al. |
| 5,344,611 A | 9/1994 | Vogler et al. |
| 5,354,838 A | 10/1994 | Murakami et al. |
| 5,454,958 A | 10/1995 | Fiehler |
| 5,489,386 A | 2/1996 | Saunders |
| 5,494,590 A | 2/1996 | Smith et al. |
| 5,505,853 A | 4/1996 | Satake |
| 5,506,333 A | 4/1996 | O'Brien et al. |
| 5,510,237 A | 4/1996 | Isogawa et al. |
| 5,525,227 A | 6/1996 | Vogler et al. |
| 5,527,843 A | 6/1996 | Murakmi et al. |
| 5,543,048 A | 8/1996 | Vogler et al. |
| 5,582,954 A | 12/1996 | Swatton et al. |
| 5,663,285 A | 9/1997 | Rounds |
| 5,731,391 A | 3/1998 | O'Brien et al. |
| 5,776,357 A | 7/1998 | Okamoto et al. |
| 5,814,220 A | 9/1998 | Mikami et al. |
| 5,863,704 A | 1/1999 | Sakurai et al. |
| 5,888,824 A | 3/1999 | Isogawa et al. |
| 5,906,744 A | 5/1999 | Carroll et al. |
| 5,986,039 A | 11/1999 | O'Brien et al. |
| 6,072,022 A | 6/2000 | O'Brien et al. |
| 6,238,578 B1 | 5/2001 | Fiehler |
| 6,248,844 B1 | 6/2001 | Gates et al. |
| 6,280,622 B1 | 8/2001 | Goodrich et al. |
| 6,361,700 B2 | 3/2002 | Gates et al. |
| 6,565,968 B1 | 5/2003 | Li et al. |
| 6,979,307 B2 | 12/2005 | Beretta et al. |
| 7,090,970 B2 | 8/2006 | Anraku et al. |
| 7,673,758 B2 | 3/2010 | Emerson |
| 7,674,388 B2 | 3/2010 | Emerson |
| 7,775,962 B2 | 8/2010 | Emerson |
| 7,780,861 B2 | 8/2010 | Emerson |
| 7,971,730 B2 | 7/2011 | Emerson |
| 2006/0160025 A1 | 7/2006 | Lungu |
| 2006/0160915 A1 | 7/2006 | Fuchs et al. |
| 2006/0212020 A1 | 9/2006 | Rainen et al. |
| 2007/0003588 A1 | 1/2007 | Chinn et al. |
| 2007/0005024 A1 | 1/2007 | Weber et al. |
| 2007/0020629 A1 | 1/2007 | Ross et al. |
| 2007/0187341 A1 | 8/2007 | Emerson |
| 2009/0146099 A1 | 6/2009 | Anraku et al. |

FOREIGN PATENT DOCUMENTS

| | | |
|---|---|---|
| EP | 0705882 | 9/1995 |
| EP | 0744026 | 12/1995 |
| EP | 0766973 | 9/1996 |
| EP | 0928301 | 9/1997 |
| KR | 1020050030337 | 3/2005 |
| KR | 1020050115235 | 12/2005 |
| WO | 99/64931 | 12/1999 |
| WO | 2005/011495 | 2/2005 |
| WO | 2007/139018 | 12/2007 |

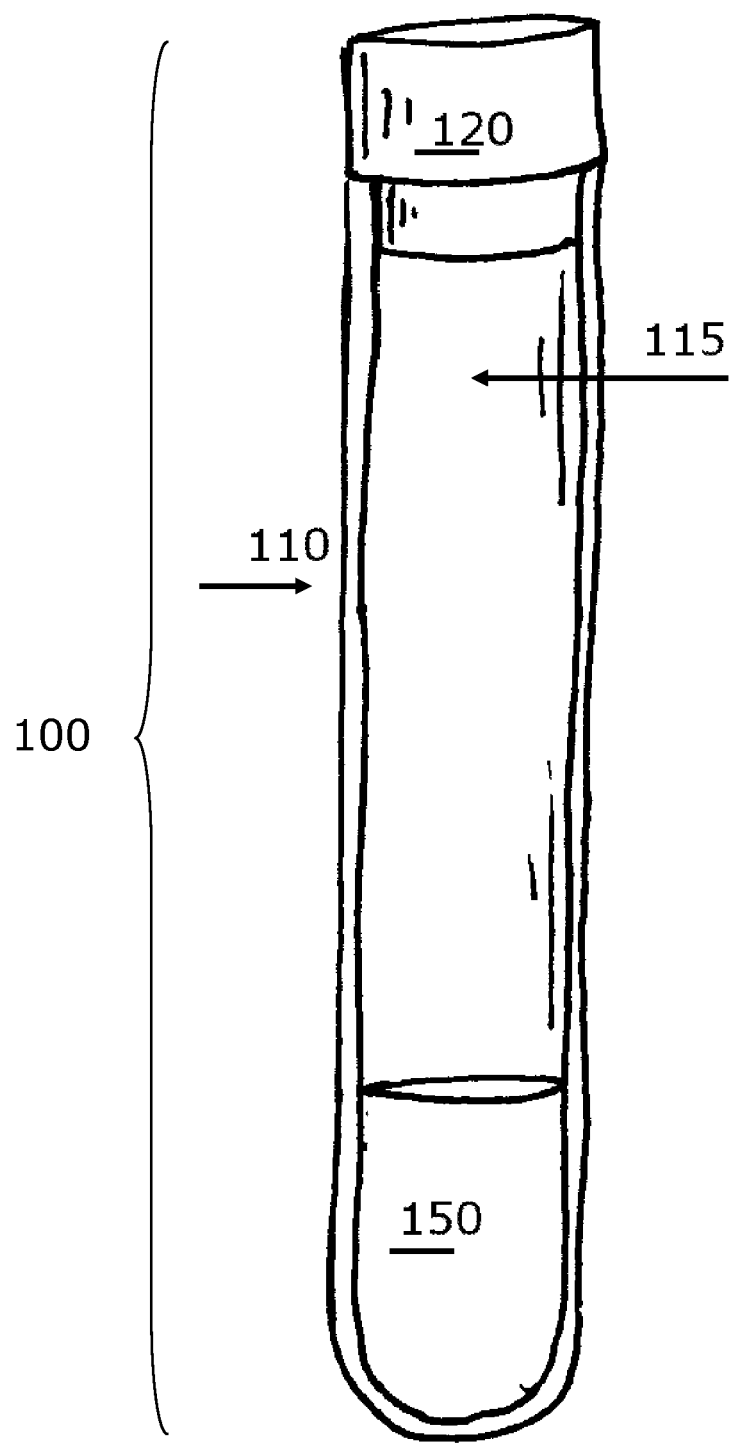
Figure 1A: Blood collection with separator substance.

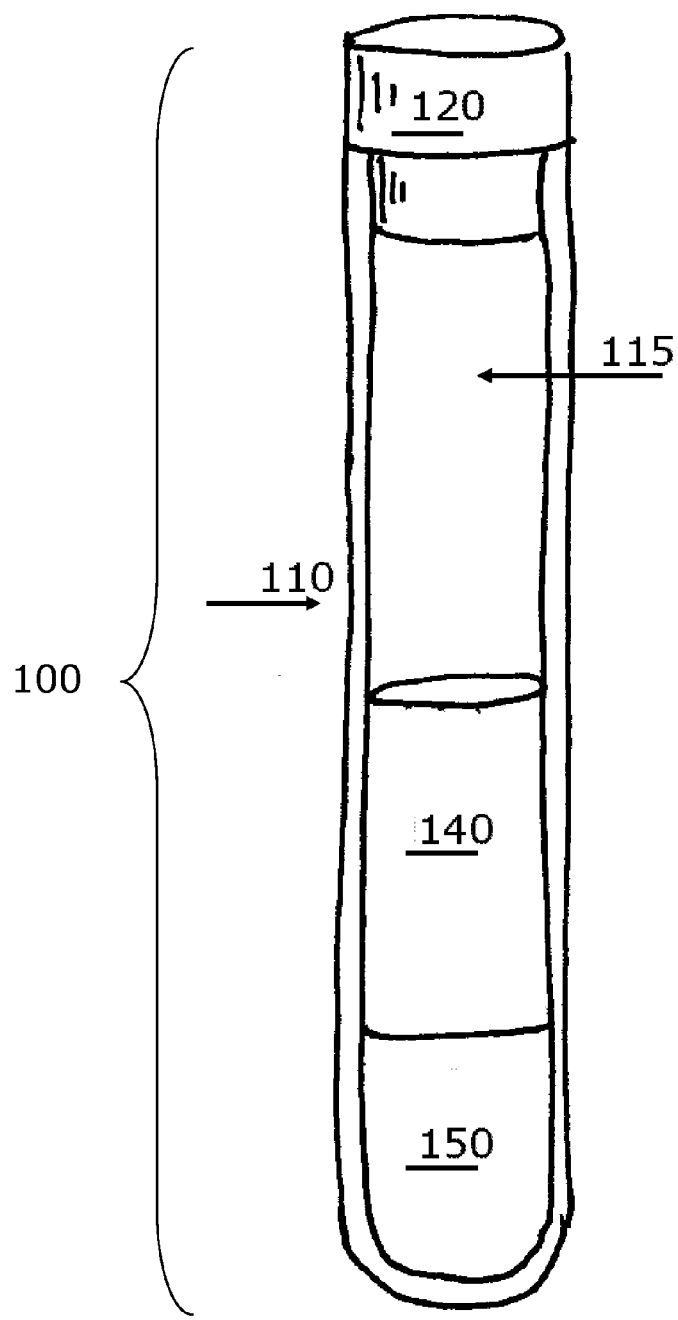
Figure 1B: Blood collection with separator substance of Figure 1A with blood and before centrifugation.

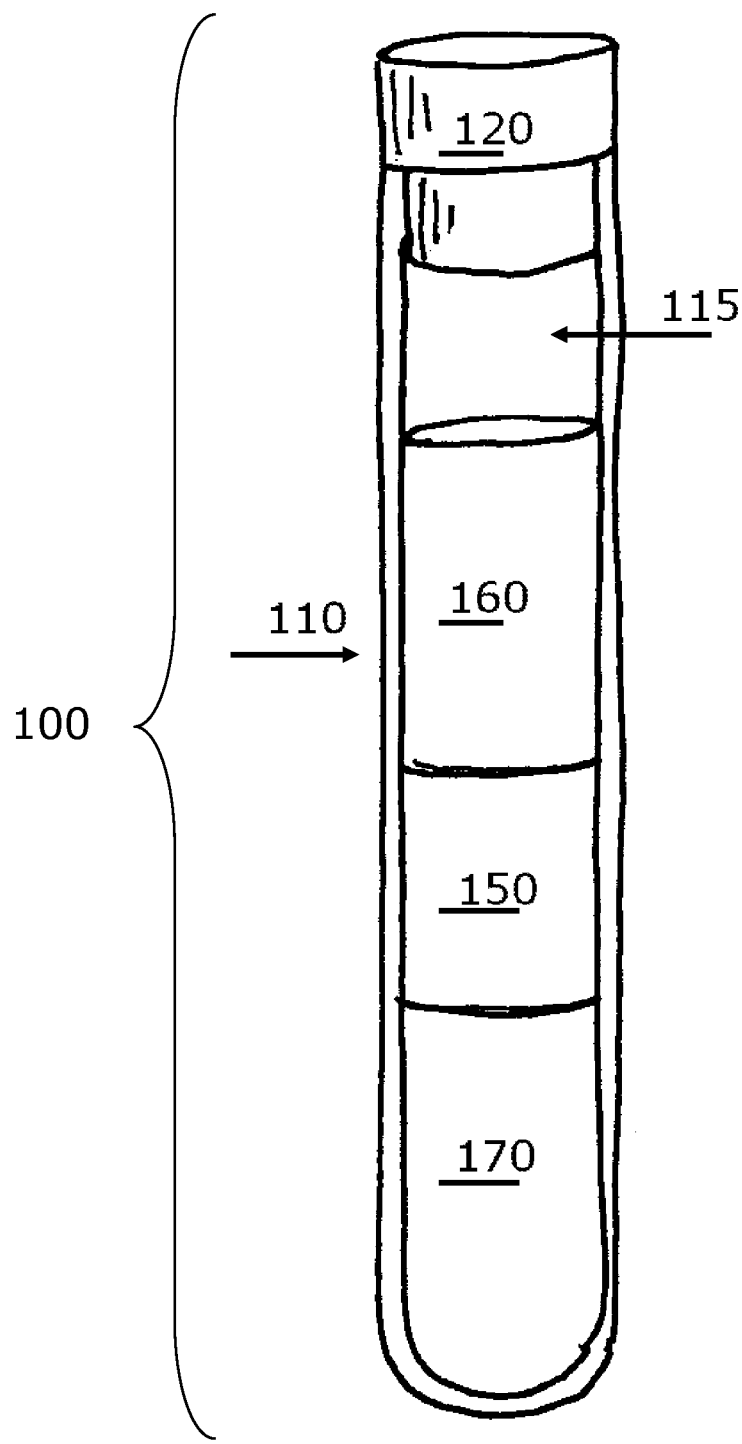
Figure 1C: Blood collection tube of Figure 1B after centrifugation.

COLLECTION TUBES APPARATUS, SYSTEMS, AND METHODS

This application is a divisional of co-owned pending U.S. application Ser. No. 12/691,569 filed Jan. 21, 2010 which is a divisional of co-owned, U.S. Pat. No. 7,673,758 issued Mar. 9, 2010 which is a continuation-in-part of co-owned U.S. Pat. No. 7,674,388 issued Mar. 9, 2010 which claims priority to co-owned U.S. provisional patent application 60/707,299 filed Aug. 10, 2005. These and all other extrinsic references are incorporated herein by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is separation technologies.

BACKGROUND

Analysis of blood samples often requires separation of whole blood into a serum fraction and a cell-containing fraction. It is well known in the art that whole blood separation can be carried out through centrifugation by disposing whole blood into a blood collection tube, placing the tube into a centrifuge, and spinning down the blood.

Unfortunately, once the blood separates, the fractions of the whole blood can remix causing contamination of the fractions through diffusion, agitation, sample extraction, or other undesirable interaction. Ideally, the two fractions should remain isolated to ensure no contamination occurs when accessing the desired fraction.

Any system that isolates the fractions of whole blood must include a separator substance having a suitable density within the tube. Suitable densities are about 1.04 g/cm$^3$ and are between the density of the heavier cell-containing phase and the density of the lighter serum-containing phase. When whole blood is added to the tube and the tube is centrifuged, the separator substance migrates to between the fractions isolating the two fractions from each other. An example collection tube using a gel as a separator substance and that is flowable with whole blood can be found in U.S. Pat. No. 4,946,601 to Fiehler. An example separator substance that is also flowable with whole blood can be found in U.S. Pat. No. 6,248,844 and U.S. Pat. No. 6,361,700 to Gates et. al. In those patents the substance is a polyester curable to a desired viscosity.

Although providing a flowable substance allows for separating the fractions of whole blood, flowable substances have several disadvantages. A flowable substance remains flowable even after centrifugation which results in a risk of contamination of the sample if proper care is not taken to keep the sample suitably still and protected from agitation. For example, it is known to use a thixotropic gel in a blood collection tube before centrifugation.

U.S. Pat. No. 4,818,418 to Saunders discusses the use of a thixotropic gel in blood collection tubes. The problem with thixotropic gels, however, is they do not form a sufficiently permanent separation barrier between the fractions of whole blood. When a sample is extracted from the tube with a pipette, the substance can contaminate or plug the pipette if it touches the substance due to the flowable nature of the substance. If the substance is formulated or configured with a high viscosity to provide a sufficiently solid or permanent barrier to overcome the previous disadvantages, then the substance is no longer suitably flowable with whole blood resulting in prohibitive centrifuge times. Short centrifuge times are critical in life or death situations where a blood analysis result is required quickly.

An alternative approach taken by collection tube manufactures is to provide moveable solid barriers. Examples of suitable solid substances include the intermediate density polymers found in U.S. Pat. Nos. 3,647,070 where polymer spheres form the barrier layer. U.S. Pat. No. 5,266,199 describes a tube-and-ball valve that controls separation of the serum from the cell-containing phase. However, such physical barriers do not provide a sufficient seal between the fractions and are often either incomplete and tend to leak, or impracticable for other various reasons.

These and other solutions for whole blood separation lack the necessary features to ensure the separated factions of whole blood are effectively protected against contamination due to undesirable sample interactions while supporting short centrifugation times. Thus, there is still a need for liquid separation technologies in which the separation layer is solidified after centrifugation.

SUMMARY OF THE INVENTION

The present invention provides apparatus, systems and methods in which a separation layer is solidified after centrifugation.

In preferred embodiments the separation layer is hardened through polymerization. Suitable separator substances are formulated to have a suitable density intermediate to the fractions of the liquid being separated. Where the liquid being separated is whole blood, for example, the separator substance would be formulated to have a density between an average density of a serum fraction of whole blood and a cell-containing fraction of whole blood, and to be flowable in whole blood.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWING

FIG. 1A is a side perspective view of a blood collection tube having a polymerizable separator substance that can harden.

FIG. 1B is a side perspective view of the blood collection of tube of FIG. 1A after adding whole blood.

FIG. 1C is a side perspective view of the blood collection tube of FIG. 1B after centrifugation.

DETAILED DESCRIPTION

Collection Tube

In FIG. 1A blood collection tube 100 generally comprises tube 110, plug 120, and separator substance 150, where tube 110 has lumen 115. Tube 110 is preferably manufactured out of a suitably rigid material to support a vacuum within lumen 115. Example materials include hard plastics, glass, or other similar materials. Lumen 115 is of sufficient volume to hold a desirable sample of whole blood or liquid. Typical volumes range from a few ml to 10 ml or greater. Plug 120 fits sufficiently snug into tube 110 to maintain the vacuum within lumen 115. It is contemplated that plug 120 is manufactured to provide a color code or other indication that separator substance 150 is disposed within lumen 115. An example of an acceptable tube that can be used to produce collection tube 100 includes the Vacutainer® specimen collection products developed by Becton, Dickenson and Company (Franklin Lakes, N.J. USA 07417).

Although the preferred embodiment includes tube 110, it is contemplated that collection tube 100 could be replaced with other vessels that contain a liquid and optionally support a vacuum. Alternative examples of vessels include flasks, jars, beakers, bottles, or phials. The contemplated alternative vessels have utility when the inventive subject matter is applied to alternative markets beyond blood collection.

In a preferred embodiment, collection tube 100 is produced by disposing separator substance 150 within lumen 115, and introducing a vacuum within lumen 115 in preparation for sale. It is also preferred that no more than about 1 ml, or about 2 grams, of separator substance 150 is disposed into lumen 115 for a typical 10 ml collection tube. It is contemplated that other amounts, more or no more than 1 ml, could also be used to fit a specific use case. For example a smaller version of tube 110 would require less of separator substance 150, while a larger version might require more to make an adequate sealed barrier.

The optional vacuum can be introduced by simply decompressing the volume of lumen 115 by using a suitable pump. The term "vacuum" within the context of this document means a partial vacuum having a pressure lower than the pressure external to tube 110.

It is also contemplated that a user could add one or more separator substances to a collection tube after purchase, as opposed to having a separator substance pre-disposed within the tube.

FIG. 1B represents an exemplary embodiment of a blood collection tube after introduction of blood 140, and before centrifugation. Although blood 140 is shown on top of separator substance 150, the two might have characteristics in which they are free to flow or mix.

FIG. 1C represents an exemplary embodiment of a blood collection tube after centrifugation. During centrifugation blood 140 separates into serum fraction 160 and cell-containing fraction 170. When separator substance 150 has a density that is intermediate to that of serum faction 160 and cell-containing fraction 170, it migrates between the two fractions during centrifugation, thereby isolating fractions 160 and 170 from each other. Separator substance 150 can then be rapidly hardened through polymerization when triggered by a suitable energy source.

Separator Substance

Preferably separator substance 150 rapidly hardens during final polymerization to a hardness that is resistant to penetration by a pipette, to decanting, or even to freezing.

Hardness can be measured using any suitable hardness scale including one of the Shore hardness scales. The Shore 00 hardness scale is used to measure soft substances including gels or foams. The Shore A hardness scale is used to measure substances having an intermediate hardness including rubbers. The Shore D hardness scale is used to measure harder substances including plastics. Although the preceding Shore hardness scales are used for different various substances, the scales all overlap at the low end of their spectrums. Therefore, a value of 10 on the Shore D scale is harder than a value of 10 on the Shore A scale which in turn is harder than a value of 10 on the Shore 00 scale. Separator substance 150 is preferably formulated to harden to at least 1 on the Shore 00 hardness scale. More preferred embodiments of separator substance 150 harden further to at least 10 on the Shore A hardness scale. In yet other embodiments separator substance 150 harden even further to at least 10 on the Shore D hardness scale.

Within the context of this document, the term "rapidly hardens" means to harden to at least 1 on the Shore 00 hardness scale within at least 10 minutes. One of the aspects of the inventive subject matter is appreciating that a shorter time to harden can be advantageous over a longer timer. Having separator substance that hardens within a few minutes, for example, could be important for a hospital to analyze a sample in a critical life or death situation. In preferred embodiments, the time to harden is no more than 5 minutes, more preferably no more than 1 minute, and most preferably no more than 10 seconds.

The hardened barrier of preferred separator substances adheres to the walls of lumen 115 substantially sealing the cell-containing fraction and protecting the fractions from contamination due to diffusion, agitation, sample extraction, or other undesirable interaction. In preferred embodiments the final thickness of the barrier is no more than 5 mm.

Separator substance 150 is preferably a biocompatible organic polymer. Among other things, biocompatibility means that the separator substance 150 does not interfere with or alter any of the characteristics of the substances being tested. In the case of blood, for example, the separator substance 150 should not interfere with pH, pigmentation, any of the enzymes being tested, or with concentrations of proteins, gases, or any other components.

In yet other embodiments, it is contemplated that the substance could include a component that intentionally reacts with the sample being separated. For example, the separator substance could include a coagulant, blood thinner, or other substance that interacts with whole blood.

In blood separation tubes, the separator substance 150 should have a density of between about 1.01-1.09 $g/cm^3$, and most preferably about 1.04 $g/cm^3$. Unless the context dictates otherwise, all ranges herein are to be interpreted as being inclusive of their endpoints.

An acceptable separator substance can include a polyester backbone similar to those described in U.S. Pat. Nos. 6,361,700 and 6,248,844, both of which are incorporated by reference herein. Polymerization is preferably carried out to achieve the desired density of between about 1.04-1.06 $g/cm^3$. However, and in contrast to the methods and compositions provided in the '700 and '844 patent, polymerization is not run to completion but stopped using a polymerization terminator (e.g., using radical quenchers, catalyst complexing agent, etc.) in a minimum amount effective to stop further polymerization.

As the sample contacts the incompletely cured polymer (separator substance 150), it is contemplated that the polymerization terminator is diluted to a concentration that allows the polymerization to be re-initiated. Prior to re-initiation, blood 140 is separated in the container by centrifugation, which will leave cell-containing fraction 170 in the bottom portion of tube 110 and serum fraction 160 in the upper portion of tube 110, wherein both fractions are separated by the incompletely cured polymer (separator substance 150). Re-initiation of polymerization may be assisted by irradiating the polymer with UV light or other suitable energy source. Thus, it should be appreciated that the polymeric is additionally cured after the separation is completed and the so separated serum can then be accessed without contamination of a pipette, decanted, or even frozen. Moreover, it should be recognized that the final cured barrier layer is substantially permanent (i.e., stable over several days, or even weeks).

While it is generally acceptable that collection tube 100 include a polyester polymer as separator substance 150, it should be noted that the exact nature of the polymeric material is not limiting to the inventive subject matter, and that numerous alternative polymers are also suitable. Indeed all known polymers suitable for whole blood separation are deemed appropriate for use herein, including silicon oil, polyamides, olefinic polymers, polyacrylates polyesters and copolymers thereof, polysilanes, and polyisoprenes. To achieve a desired initial density (typically between about 1.03 and 1.05), it is contemplated that the density may be adjusted by virtue of molecular composition, as well as by inclusion of appropriate filler material (e.g., silica, latex, or other inert material). For example, suitable polymeric materials are described in U.S. Pat. Nos. 3,647,070, 3,920,557, or 3,780, 935, or in EP 0 928 301 or 0 705 882, which are incorporated by reference herein. Furthermore, it is contemplated that the serum separators may include additional materials and/or reagents to achieve a desired bio-reactive purpose. For example, the separators presented herein may include EDTA, heparin, citrate, dextrose, etc. It should be noted that the term "serum" is used herein to also include plasma, and other substantially cell free fluids derived from whole blood.

Depending on the particular material, it is contemplated that the mode and/or mechanism of polymerization to the separator polymer may vary considerably, and all know manners of polymerization are deemed suitable for use herein. For example, contemplated polymerizations include various radical or cationic polymerizations (e.g., using photolabile compounds, radical startes, etc.), condensation polymerizations, esterifications, amide formation, etc. Thus, reactive groups will especially include acid groups (and most preferably mono- and dicarboxylic groups), conjugated diene groups, aromatic vinyl groups, and alkyl(meth)acrylate. Such exemplary reactive groups and reaction conditions are described, for example, in U.S. Pat. No. 6,989,226, which is incorporated by reference herein. It should furthermore be appreciated that the reactive groups can be coupled to the terminus of a polymer as end groups as described in WO 99/64931, which is incorporated by reference herein, or that the reactive groups may be provided as pendant groups (e.g., as described in U.S. Pat. No. 5,336,736, incorporated by reference herein).

It is generally preferred that polymerization is fully supported by reactive groups on pre-polymer, but additional reagents may also be suitable, including radical starters, including those described in U.S. Pat. Nos. 5,582,954, 4,894, 315, and 4,460,675, which are incorporated by reference herein. Additionally contemplated separator substances also include those that provide a crosslinking group to the polymer such that the polymer has reactive groups that react with a bifunctional crosslinker (e.g., ethylenically unsaturated compounds) to thereby form crosslinked polymers. Yet additional contemplated separator substances also include those having promoters that accelerate polymerization.

An acceptable example of separator substance 150 includes a substance known as "M1L1A1" co-developed by the University of Maryland and University of California Irvine. M1L1A1 is a polymeric separator substance comprising the following: (M1) a monomer Trimethylolpropane propoxylate triacrylate from Sigma-Aldrich Cat. No. 407577, (L1) CYTEC Aliphatic Urethane Acrylate EBECRYL 230 from Cytec Industries, Inc., and (A1) Additol BDK, 2,2-Dimethoxy-1,2-diphenyl-ethan-1-one also from Cytec Industries, Inc. Additionally, M1L1A1 has desirable properties for use with whole blood including an adjustable density by adding fumed silica, it is flowable in whole blood when centrifuged, thixotropic, a hardness greater than 10 on the Shore A hardness scale after polymerization, hardens in no more than 10 seconds under exposure to UV light, biocompatible with whole blood, and forms a hardened seal impermeable to the cell-containing fraction of whole blood and that is resistant to penetration of a pipette. M1L1A1 hardens under a UV light source that radiates light in the wavelengths from 10 nm to 450 nm. A preferred UV light source radiates in the range 250 nm to 400 nm. All suitable energy sources are contemplated for triggering polymerization. It is contemplated that an existing centrifuge having a UV source can be used to polymerize the separator substance, or a centrifuge can incorporate a suitable energy source capable of triggering polymerization.

Preferably, the temperature of the collection tube contents changes by no more than 10 degrees Celsius during polymerization; more preferably by no more than 5 degrees Celsius. Short exposure times ensures the sample will maintain appropriate pigmentation levels, gas levels, temperatures, protein levels, or other characteristics associated with whole blood.

Alternative Embodiments

Although the preferred embodiment of the inventive subject matter primarily focuses on blood collection tubes, one should recognize that the systems, apparatus, and methods presented herein can be applied to alternative markets beyond blood collection tubes. Similar techniques to those disclosed herein can also be employed to separate nearly any fluid having more than one constituent phase. For example, a separator substance can be provided to separate fluids including urine, water samples, oil, wine, or other multi-phase fluids. For fluids having more than two phases, it is contemplated that a collection tube can contain more than one separator substances which are used to separate at least three phases of the fluid.

In some applications, a user of a collection tube might require access to the cell containing portion as well as a serum containing portion. In such cases the separator substance can be tuned to have an appropriate lower hardness (no more than about 10 on the Shore 00 hardness scale) to allow decanting the serum portion without disturbing the cell-containing portion. A pipette can then penetrate the separator substance barrier to access the cell-containing portion. Alternatively, the collection tube can be produced to have two opens ends where the "top" and "bottom" of the tube both have plugs. The cell-containing portion can then be accessed through the bottom plug. The bottom plug can be sized and dimensioned to have a rounded shape to fit the shape of a centrifuge holder and to provide support during centrifugation.

Advantages

There are numerous advantages of producing a collection tube having a rapidly hardening separator substance for use in whole blood separation. One advantage includes that the fractions of whole blood are effectively isolated from each other permanently with little or no chance of contamination due to diffusion, agitation, sample extraction, or other undesired interaction. In addition, using a separator substance that substantially hardens as a separation layer implies one requires a smaller amount of material than when using a thixotropic gel as a separator substance, for example. Consequently, less time is required for centrifugation to achieve full separation because there is less material to migrate to the separation layer and more volume within the tube is available for a blood sample.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of separating multi-phase fluid comprising:
   providing access to a vessel tube containing a first separator substance that polymerizes within 10 minutes to at least 1 on the Shore 00 hardness scale when triggered by a suitable energy source;
   disposing a multi-phase fluid into the vessel tube;
   separating the multi-phase fluid into a first constituent phase and a second constituent phase separated by the separator substance; and
   exposing the separator substance after separation to an energy source triggering polymerization of the separator substance within 10 minutes to at least 1 on the Shore 00 hardness scale.

2. The method of claim 1, wherein the multi-phase fluid is selected from the group consisting of blood, urine, water samples, oil, and wine.

3. The method of claim 1, wherein the multi-phase fluid comprises at least three constituent phases.

4. The method of claim 3, further comprising a second separator substance.

5. The method of claim 4, wherein the first separator substance has a density between a first constituent density and a second constituent density, and wherein the second separator substances has a density between a the second constituent density and a third constituent density.

* * * * *